United States Patent [19]

Siegel

[11] Patent Number: 4,491,740
[45] Date of Patent: Jan. 1, 1985

[54] WINDMILL POWER SYSTEM

[76] Inventor: Edward A. Siegel, 16 Byron Dr., Granby, Conn. 06035

[21] Appl. No.: 353,183

[22] Filed: Mar. 1, 1982

[51] Int. Cl.³ .......................... F03D 3/02; F03G 7/02; F03G 7/06
[52] U.S. Cl. .................................. 290/55; 60/641.12; 415/2 A; 415/3
[58] Field of Search ................. 60/641.12; 290/44, 55; 415/2-4, 202

[56] References Cited

U.S. PATENT DOCUMENTS 4,066,381  1/1978  Earnest ............................... 415/202

FOREIGN PATENT DOCUMENTS 2307982  11/1976  France .............................. 60/641.12
2389779   1/1979  France .............................. 415/2 A
2461832   3/1981  France .............................. 415/2 A
2488337   2/1982  France .............................. 415/2 A Primary Examiner—Stanley J. Witkowski
Assistant Examiner—Shelley Wade
Attorney, Agent, or Firm—Fishman & Dionne

[57] ABSTRACT

The present invention relates to a windmill power system, particularly a passive solar powered windmill. Specifically, the present invention is directed to a windmill in which a solar chamber and a stack produce an upwardly flowing natural convection draft which is utilized to turn the blades of a horizontally positioned windmill. A conventional vertical windmill may also be used in conjunction with the horizontal windmill. The invention can also be used in a cogeneration system or with any heat source, with waste heat being used to heat the air in the solar chamber.

4 Claims, 4 Drawing Figures

WINDMILL POWER SYSTEM

DESCRIPTION OF THE PRIOR ART

Recent years have witnessed an increased search for alternate power sources. Of particular interest is the utilization of wind or air movement to produce electricity. The general principal behind converting wind power into electrical energy is to cause the rotational movement of a windmill by the flow of air. Conventional windmills utilize naturally occuring winds and are provided with various means for maintaining the position of the windmill into the wind. Other devices have proposed to establish a draft to drive a windmill by heating air to create an upwardly flowing draft. This heating has involved solar or conventional heating means. However these prior proposed devices have been impracticable because they rely on stack height to create the necessary air velocity, thus requiring stack heights which are impractical and uneconomical.

SUMMARY OF THE PRESENT INVENTION

The present invention relates to a windmill power system, particularly a passive solar powered windmill. Specifically, a convection draft flow, which is produced within a solar chamber and stack (having a low height to diameter ratio), is advantageously concentrated by an aerodynamic plug in the stack at the tips of a horizontally positioned windmill at the top of the stack. The height to diameter ratio of the stack is less than 10 to 1, and preferably less than 5 to 1.

In the present invention, air is heated by solar heating, but other means, such as an electrical or fossil fuel heating may be employed for supplemental heating. This solar heating is preferably carried out by providing an elongated glass "greenhouse" solar chamber structure which gradually increases in size from the air inlet to the air discharge. The larger discharge end of the structure is interconnected with a vertically rising stack which is provided at its upper end with a horizontally positioned windmill. The elongated solar chamber is positioned and designed so as to thoroughly heat incoming cool air to produce the desired upward rising convection draft flow of air in the stack.

This upwardly rising flow of air is advantageously applied in a high velocity stream to the tips of the windmill by concentrating the rising air into a circular pattern of reduced flow area. This concentration is produced by providing the upward end of the vertical stack with an aerodynamic plug having a nozzle structure in the form of either a circular air flow channel or a series of air flow apertures about its periphery. Preferably, the upper end of the vertically rising stack is provided with a conically shaped plug which possesses the desired nozzle structure. By advantageously directing and concentrating the upwardly rising air to the tips of the windmill, air velocity and the efficiency of the overall system is increased. The power output of a windmill is a function of (velocity)$^3$ of the air stream driving the windmill blade. Thus, the power output of the windmill structure of this invention is exceptionally high. The windmill drives a generator to produce electric power.

It is further preferable to utilize a vertically positioned windmill in conjunction with the horizontally positioned windmill. The vertically positioned windmill is of a conventional design and combines with the horizontally positioned windmill will to jointly drive the generator to produce electrical power.

DESCRIPTION OF THE FIGURES

The present invention may be better understood and its numerous objects and advantages will become apparent to those skilled in the art by reference to the accompanying drawing wherein like reference numerals refer to like elements in the several figures and wherein:

FIG. 4 is a partial view similar to FIG. 1 showing an alternate vertical windmill configuration.

DESCRIPTION OF THE PREFERRED EMBODIMENT

Figure 1:
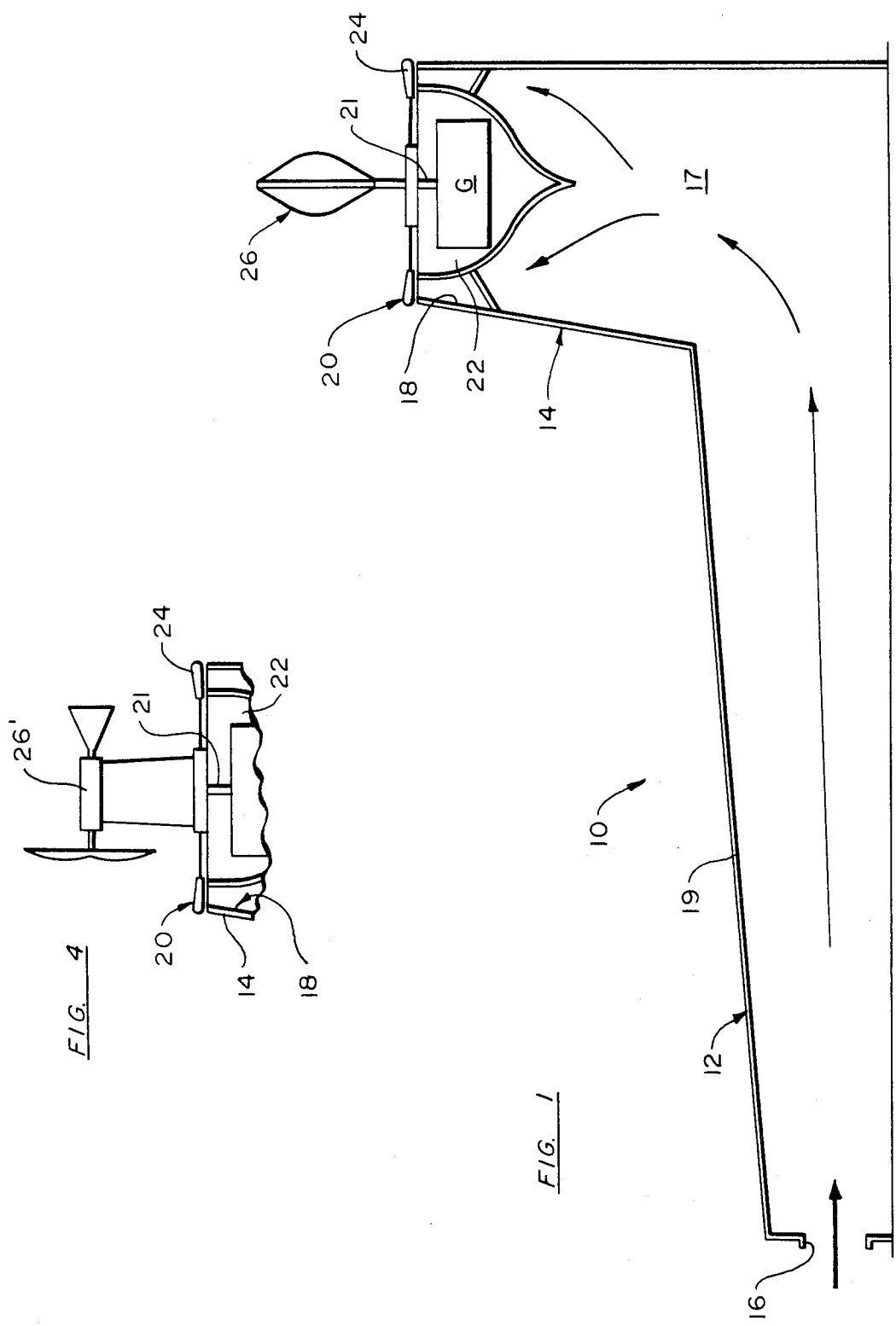
FIG. 1 is a side elevation view of the structure of the present invention.

Referring to FIG. 1 a passive solar powered windmill structure is seen generally at 10. The structure 10 is comprised of an elongated solar chamber 12 and a vertically rising stack 14. The appropriate ends of chamber 12 and stack 14 being in communication. Solar chamber 12 is constructed to be of increasing size from an air inlet end 16 to an air exit end 17, with the larger end 17 being in communication with stack 14. The smaller end of solar chamber 12 is provided with an opening or air inlet port 16. Cool air will enter inlet port 16 and be gradually heated in chamber 12 and begin to rise and flow through solar chamber 12 and stack 14 in the direction of the arrows. The air is preferably heated by solar insolation, but the chamber 12 may be heated in any other way, such as with a conventional electrical or fossil fuel heater to accomplish the desired heating of the air. Cogeneration techniques may also be used to heat chamber 12, either by using waste heat to heat chamber 12 through a heat exchanger or any waste heat gas stream may be introduced to chamber 12 through inlet 16.

In order to accomplish this solar heating, the walls 19 of chamber 12 (and possibly also the walls of stack 14) are glass or similar transparent material to form a "greenhouse" structure. Alternatively, metal or similar heat absorbing material may be used for walls of chamber 12 and/or the stack 14.

The upper end of stack 14 is provided with a discharge end 18 from which the upwardly rising draft of air is discharged. Adjacent and above discharge end 18 is a horizontal windmill 20. Windmill 20 rotates about a shaft 21 which is interconnected with an electricity producing device, such as an alternator or generator G or a pump or any other power absorbing load. In order to increase the efficiency of the system the upper end of stack 14 is provided with an aerodynamic plug 22 which concentrates and directs the upwardly flowing air with significantly increased velocity to the tips 24 of the windmill 20. Plug 22 is preferably conical and aerodynamically shaped to efficiently direct the upwardly rising air towards the tips 24 of windmill 20. Advantageously, generator G may be housed within plug 22.

Figure 2:
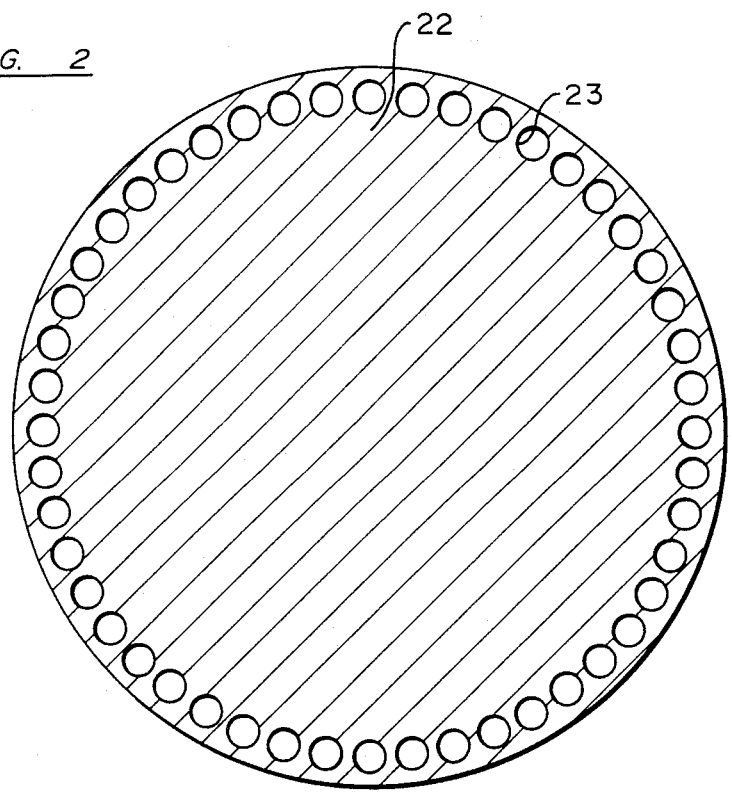
FIG. 2 is a top view of the stack plug in accordance with one embodiment of the present invention.
Figure 3:
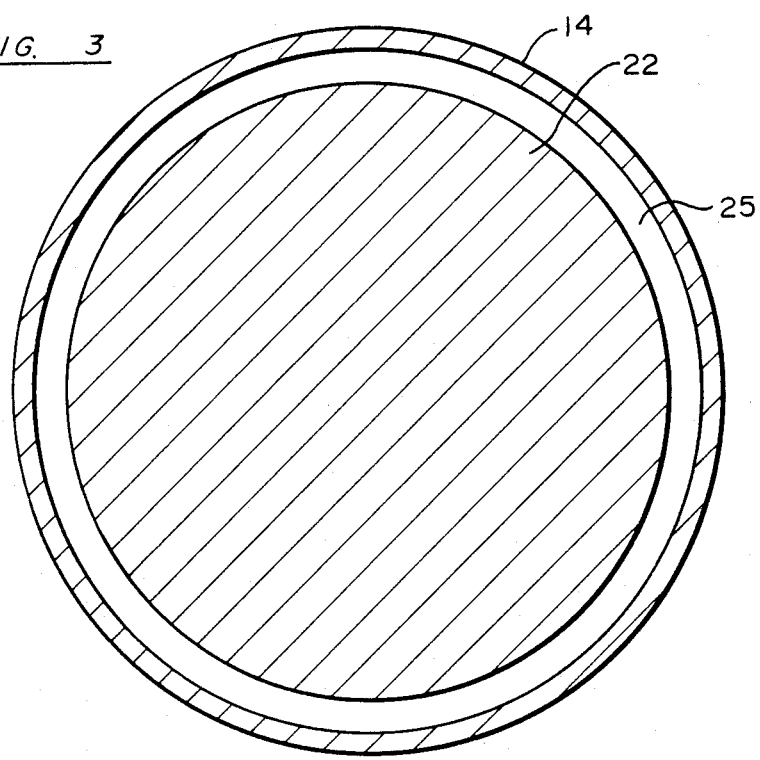
FIG. 3 is a top view of a stack plug in accordance with another embodiment of the present invention.

Plug 22 may have any possible configuration to accomplish the desired concentration of the upwardly rising air at higher velocity to the tips 24 of windmill 20. Two preferred nozzle embodiments are seen in FIGS. 2 and 3. In FIG. 2 a circular array of nozzle passages 23 (which form discharge aperature 18) are provided through the plug 22 about its periphery. The plug 22 is then snugly positioned within the uppermost section of stack 14. In FIG. 3 another embodiment is seen wherein an annular nozzle discharge aperture 25 is defined between the outer periphery of the plug 22 and the inner surface of the wall of stack 14 to define the discharge end 18 of the stack 14.

Within the scope of the present invention, the structure identified as a horizontal windmill 20 may be any reaction or flow wheel device, such as in the nature of a turbine, which will be caused to rotate by the air flow through the discharge end 18 of stack 14.

It may also be highly desirable to provide the device 10 with a supplemental conventional vertical axis wind powered windmill 26. Windmill 26 may be mounted on shaft 21 to rotate about the same axis as windmill 20 so as to operate the same electrical generating device.

Alternatively, as shown in FIG. 4, a supplemental horizontal axis windmill 28 may be connected through a gear box 20 to shaft 21.

The structure of plug 22 and nozzles (e.g., 23 or 25) or equivalent structure to increase velocity of the discharge air stream is critical to the present invention. Windmill power output is a function of the third power of the velocity of the air stream driving the windmill (i.e., power = $f(V^3)$). Without the discharge structure (plug 22 and the nozzle) of this invention, discharge air stream velocity would be very low. The plug and nozzle structure also results in a very different stack structure than in the prior art. Heretofore, proposed stacks have been of the high height to diameter ratio type, i.e., they have been relatively tall and thin to develop sufficient air flow velocity. These stacks are impractical and uneconomical to build. In the present invention, the height requirement of the stack is minimized, because the plug and nozzle structure generates the necessary air velocity. Thus, the stack may have a low height to diameter ratio, on the order of not more than 10 to 1, and preferably not more than 5 to 1.

While the preferred embodiments have been described and illustrated, various modifications and substitutions may be made thereto without departing from the spirit and scope of the invention. Accordingly, it is to be understood that the present invention has been described by way of illustration and not limitation.

What is claimed is:

1. A power generation system including:
heating chamber means for heating a stream of air;
said heating chamber means having inlet means for the entry of air and discharge means for the discharge of air, and said heating chamber means increasing in size from said inlet means to said discharge means;
stack means communicating with said discharge end of said heating chamber means to receive heated air from said heating chamber means, said stack means having a discharge end at the upper portion thereof;
air velocity increasing means in said stack means to increase the velocity of air flowing to said discharge end of said stack means, said air velocity increasing means delivering air of increased velocity to radially outward portions of said stack;
air powered means positioned downstream of said air velocity increasing means to be driven by the air of increased velocity from said air velocity increasing means;
said air velocity increasing means including an aerodynamic plug means in said stack means; and
said plug means defining an annular nozzle in said stack means.

2. A power generation system including:
heating chamber means for heating a stream of air;
said heating chamber means having inlet means for the entry of air and discharge means for the discharge of air, and said heating chamber means increasing in size from said inlet means to said discharge means;
stack means communicating with said discharge end of said heating chamber means to receive heated air from said heating chamber means, said stack means having a discharge end at the upper portion thereof;
air velocity increasing means in said stack means to increase the velocity of air flowing to said discharge end of said stack means, said air velocity increasing means delivering air of increased velocity to radially outward portions of said stack;
air powered means positioned downstream of said air velocity increasing means to be driven by the air of increased velocity from said air velocity increasing means;
said air velocity increasing means including an aerodynamic plug means in said stack means; and
said plut means defining an array of nozzles.

3. A windmill power generation system including:
heating chamber means for heating a stream of air;
said heating chamber means having inlet means for the entry of air and discharge means for the discharge of air, and said heating chamber means increasing in size from said inlet means to said discharge means;
stack means communicating with said discharge end of said heating chamber means to receive heated air from said heating chamber means, said stack means having a discharge end at the upper portion thereof;
air velocity increasing means in said stack means to increase the velocity of air flowing to said discharge end of said stack means, said air velocity increasing means delivering air of increased velocity to radially outward portions of said stack;
air powered windmill means positioned downstream of said air velocity increasing means to be driven by the air of increased velocity from said air velocity increasing means;
said air velocity increasing means including an aerodynamic plug means in said stack means; and
said plug means defining an annular nozzle in said stack means.

4. A windmill power generation system including:
heating chamber means for heating a stream of air;
said heating chamber means having inlet means for the entry of air and discharge means for the discharge of air, and said heating chamber means increasing in size from said inlet means to said discharge means;
stack means communicating with said discharge end of said heating chamber means to receive heated air from said heating chamber means, said stack means having a discharge end at the upper portion thereof;
air velocity increasing means in said stack means to increase the velocity of air flowing to said discharge end of said stack means, said air velocity increasing means delivering air of increased velocity to radially outward portions of said stack;
air powered windmill means positioned downstream of said air velocity increasing means to be driven by the air of increased velocity from said air velocity increasing means;
said air velocity increasing means including an aerodynamic plug means in said stack means; and
said plug means defining an array of nozzles.

* * * * *